UNITED STATES PATENT OFFICE.

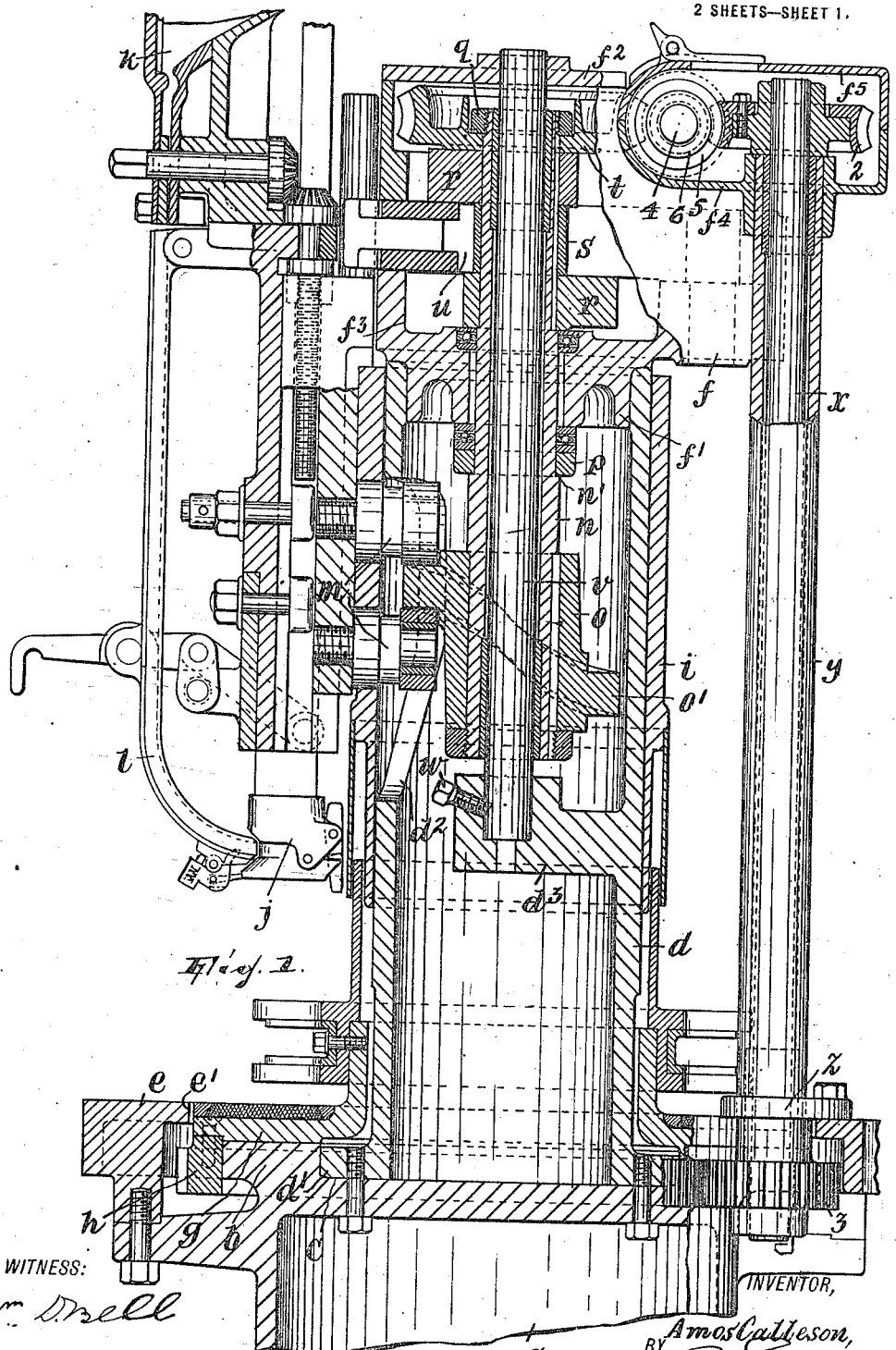

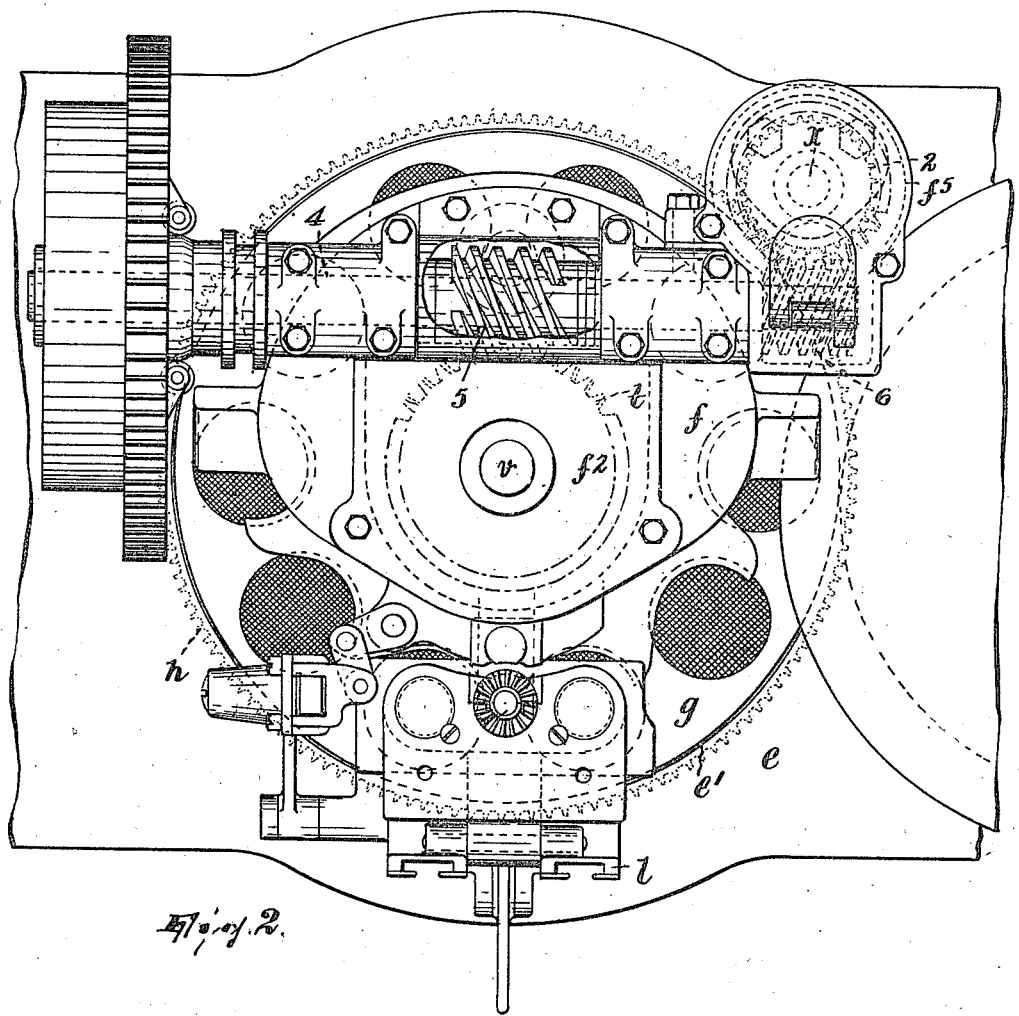

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

BOTTLE-SEALING MACHINE.

1,260,965.  Specification of Letters Patent.  Patented Mar. 26, 1918.

Application filed March 30, 1916. Serial No. 87,603.

*To all whom it may concern:*

Be it known that I, AMOS CALLESON, a citizen of the United States, residing at Brooklyn, in the county of Kings and State of New York, have invented certain new and useful Improvements in Bottle-Sealing Machines, of which the following is a specification.

This invention relates to container sealing machines and it consists in certain improvements in sealing machines of the class typified, for instance, in my U. S. Letters Patent No. 1,096,527 whereby a more substantial construction and compact organization of the parts are afforded, the construction of the machine in general is simplified and its assembly and disassembly rendered more facile, and the efficiency of the machine considerably increased.

In the accompanying drawings,

Figure 1 is a vertical sectional view of the machine taken mainly in a plane coincident with the axis of its upstanding pillar; and Fig. 2 is a plan view.

The frame includes the base $a$ having an upstanding annular race $b$ forming a recess $c$; a cylindrical upstanding pillar $d$ having an exterior flange $d'$ on its lower end whereby said pillar, stepped in the recess $c$, is bolted to the base; a table $e$ reaching to right and left of the pillar to afford support for the empty and filled bottles and bolted on the base, the table having an opening $e'$ concentric with the pillar; and a head $f$ surmounting the pillar, having a downwardly projecting portion $f'$ which fits in the latter, and being provided with a plate $f^2$ bolted to the top of the head and covering the upwardly opening cavity $f^3$ therein which receives certain moving parts to be mentioned, and also having an integral gear-casing section $f^4$ provided with a removable gear-casing section or cover $f^5$ bolted to section $f^4$.

The bottle support $g$ (otherwise designated herein the container mover) rotates on race $b$, concentric with the pillar, and excepting for an exteriorly disposed annular gear $h$ is substantially the same as in my said patent.

The cylindrical carrier $i$ oscillates and reciprocates on the pillar and is otherwise substantially the same as in my said patent, and associated therewith (by substantially the same means and in substantially the same way—not necessary of description herein— as in my said patent) so as to partake of its oscillating and reciprocating motion are one or more sealing heads, $j$, the hopper $k$ for the closures and the chute or chutes $l$ leading from the hopper to the sealing head or heads. The carrier has in the present instance two spaced roller-equipped studs $m$ projecting inwardly through an opening $d^2$ in the pillar.

A sleeve or hollow shaft $n$ penetrates the head $f$ concentrically with the pillar, projecting a short way downwardly into the latter, and has suitably affixed to its lower end a cam $o$ provided with a sinuous rib $o'$ engaged with the carrier $i$ by extending between its roller-equipped studs $m$. The sleeve has its thrust in each direction assumed by the head $f$ where it penetrates the same,—thus: Below the head, and abutting a shoulder $n'$ on the sleeve, is a collar $p$, and splined on the sleeve and held against upward movement thereon by the nut $q$ are the cams $r$ (spaced by the thimble $s$) and the worm-wheel $t$, the cams and worm-wheel being housed in the cavity $f^3$ of the head $f$ and the cams being adapted to actuate a lever $u$ which imparts the oscillating movement to the carrier $i$ as described in detail in my said patent.

To afford an axial bearing for the sleeve $n$ I provide the shaft $v$ which is stepped into an arm $d^3$, projecting inwardly from the pillar, at its lower end and fits snugly a hole in the cover plate $f^2$ at its upper end, being fixed to the arm by the set screw $w$.

Ball or other antifriction bearings may, if desired, be employed between head $f$ and collar $p$ on the one hand and said head and the lower cam $r$, as clearly shown in Fig. 1.

A vertical shaft $x$ exterior of the pillar and base, is housed and journaled in the gearing casing $f^4$—$f^5$, the casing sleeve $y$ depending from said casing and the bracket $z$ bolted to the table, and at its upper and lower ends it carries the worm-wheel 2 and pinion 3, respectively, the latter engaging the gear $h$ of the bottle support.

4 is the drive shaft, journaled horizontally in the cover plate $f^2$ between and carrying worms 5 and 6 meshing with the worm-wheels $t$ and 2.

It will be obvious that my present invention involves these advantages, to wit, that the container mover is driven more smoothly than before because it derives its motion from the power source 4 coördinately with instead of through the rotary cam-carrying member which effects the raising and lowering of the sealing-head-carrying structure (carrier i); and that the construction in general, and of the superstructure of the machine in particular, is simplified and the assembly and disassembly of the parts rendered more facile in that the cam-including member may be made relatively short, projecting only part way down into the pillar, and is supported against both lateral and vertical play well up in the support afforded by the pillar and head, the pillar itself being devoid of all inaccessible movable parts in its base portion requiring attention to keep them in order and from being fouled by the liquid wasted in the bottling operation.

Having thus fully described my invention, what I claim as new and desire to secure by Letters Patent is:—

1. A container sealing machine including, in combination, an upright support having a pillar, an up and down sealing-head-carrying structure guided by the pillar, an upright rotary member arranged in the pillar and including a cam engaged with said structure, said support confining said member against up and down movement and having a part thereof extending through and affording a bearing for said member, and means to rotate said member.

2. A container sealing machine including, in combination, an upright support having a pillar, an up and down sealing-head-carrying structure guided by the pillar, an upright rotary member arranged in the pillar and including a cam engaged with said structure, a shaft penetrating and affording an axial bearing for said member and supported above and below said member by the support, said support confining said member against up and down movement, and means to rotate said member.

3. A container sealing machine including, in combination, an upright support having a pillar and a head on the pillar, an up and down movable sealing-head-carrying structure guided by the pillar, an upright rotary member arranged in the pillar and including a cam engaged with said structure, said member penetrating and having its vertical thrust in each direction assumed by the head, and means to rotate said member.

4. A container sealing machine including, in combination, an upright support having a pillar and a head on the pillar, an up and down movable sealing-head-carrying structure guided by the pillar, an upright rotary member arranged in the pillar and including a cam engaged with said structure, said member penetrating and having its vertical thrust in each direction assumed by the head and said support having an axial bearing means for said member, and means to rotate said member.

5. A container sealing machine including, in combination, an upright support having a pillar and a head on the pillar, an up and down movable sealing-head-carrying structure guided by the pillar, an upright rotary member arranged in the pillar and including a cam engaged with said structure, said member penetrating and having its vertical thrust in each direction assumed by the head, a shaft penetrating and affording an axial bearing for said member and supported above and below said member by the support, and means to rotate said member.

In testimony whereof I affix my signature.

AMOS CALLESON.